United States Patent
Gilbert et al.

(10) Patent No.: US 8,050,541 B2
(45) Date of Patent: Nov. 1, 2011

(54) SYSTEM AND METHOD FOR ALTERING PLAYBACK SPEED OF RECORDED CONTENT

(75) Inventors: Stephen S. Gilbert, Lake Zurich, IL (US); Loren J. Rittle, Naperville, IL (US); Bryan A. Thale, Algonquin, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 1623 days.

(21) Appl. No.: 11/388,034

(22) Filed: Mar. 23, 2006

(65) Prior Publication Data

US 2007/0223873 A1     Sep. 27, 2007

(51) Int. Cl.
  H04N 5/783  (2006.01)
(52) U.S. Cl. ............. 386/350; 386/E5.052; 348/E7.061
(58) Field of Classification Search ............ 386/68, 386/96, 46, 350, E5.052; 348/E7.061
  See application file for complete search history.

(56) References Cited

U.S. PATENT DOCUMENTS

| | | | | |
|---|---|---|---|---|
| 4,393,415 | A * | 7/1983 | Hurst | 386/109 |
| 5,386,493 | A * | 1/1995 | Degen et al. | 704/267 |
| 5,664,044 | A * | 9/1997 | Ware | 386/75 |
| 6,898,566 | B1 * | 5/2005 | Benyassine et al. | 704/226 |
| 2004/0267540 | A1 * | 12/2004 | Boillot et al. | 704/278 |
| 2007/0120175 | A1 * | 5/2007 | Tanaka | 257/315 |
| 2007/0150175 | A1 * | 6/2007 | Shen et al. | 701/200 |

FOREIGN PATENT DOCUMENTS

JP          10049191 A  *  2/1998

OTHER PUBLICATIONS

Telecommunication Standardization Sector of International Telecommunication Union ITU-T Recommendation p. 563 "Single-Ended Method for Objective Speech Quality Assessment in Narrow Band Applications.".
J. P. Verhasselt and J. P. Martens, "A fast and reliable rate of speech detector," in Proc. Int. Conf. Spoken Language Processing (ICSLP), vol. 4, 1996, pp. 612-615.
R. Faltlhauser, T. Pfau, and G. Ruske, "On-line speaking rate estimation using gaussian mixture models," in Proc. IEEE Int. Conf. Acoust., Speech and Signal Processing (ICASSP), vol. III, 2000, pp. 1355-1358.
T. Pfau and G. Ruske, "Estimating the speaking rate by vowel detection," in Proc. IEEE Int. Conf. Acoustics, Speech and Signal Processing (ICASSP), vol. 2, 1998, pp. 945-948.
N. Morgan and E. Fosler-Lussier, "Combining multiple estimators of speaking rate," in Proc. IEEE Int. Conf. Acoustics, Speech and Signal Processing (ICASSP), vol. 2, 1998, pp. 729-732.

* cited by examiner

*Primary Examiner* — Thai Tran
*Assistant Examiner* — Girumsew Wendmagegn

(57) ABSTRACT

A method, apparatus (100) and system (200) for altering the playback speed of recorded content (105) to match a target syllable rate is provided. A user may enter a desired, target playback syllable rate through a user interface (101), such as a keypad or touch screen. Alternatively, the target playback syllable rate may be determined from identification of the source of the recorded content (105). An actual playback syllable rate (106) associated with the recorded content (105) is then determined. The recorded content (105) is then altered, by time domain harmonic scaling in one embodiment, such that the altered playback speed (109) substantially matches the target playback syllable rate. In so doing, a listener is able to receive recorded content (105) at a faster or slower rate than it is produced. Elements that may compromise the intelligibility of the recorded content (105), including distortion (114), background noise (113), ambient noise (117) and audible intonations (115), may be measured such that the target playback syllable rate may be compensated.

19 Claims, 4 Drawing Sheets

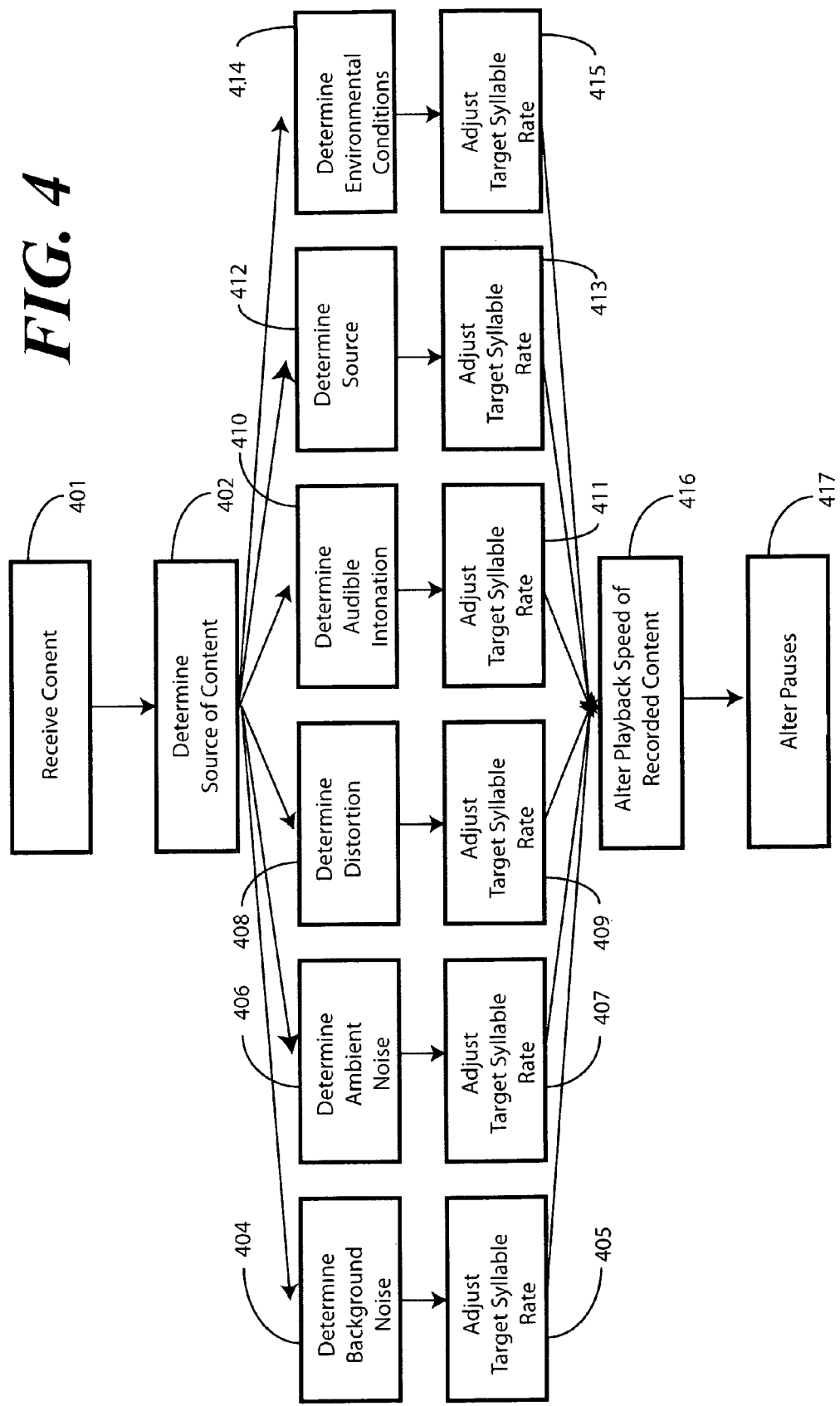

SYSTEM AND METHOD FOR ALTERING PLAYBACK SPEED OF RECORDED CONTENT

BACKGROUND

1. Technical Field

This invention relates generally to a system and method of altering the playback speed of recorded content such as audio or video, and more specifically to a system and method where the playback speed of recorded content is altered so as to match a target syllable rate associated with user input or source of origin.

2. Background Art

With the advent of new technology, people have an increasing number of options for receiving news, entertainment and other information. For example, there was a time when the only way to "read" Tolstoy's War and Peace was to actually sit down and physically read the text on each page. At over 1400 pages in length, this was a daunting, time consuming task. At 20 pages a day, it would take nearly three months to complete the work. Additionally, while reading, the reader can do essentially nothing else—the hands must hold the book and turn the pages, while the eyes are fixed on the text. A person reading such a novel is simply unable to do another task simultaneously, like exercising, cooking or driving.

Advances in technology have given "books on tape". With a recorded book, rather than actually reading the words, a user may simply place a cassette tape or compact disc into a suitable player. The user then listens as an articulate reader reads the book aloud. With the advent of books on tape, an entirely new audience has been introduced to, among other works, classic novels as they can be "read" while driving, jogging, or doing other activities. Additionally, since the reader's pace is steady and never tires, a lengthy novel like War and Peace can generally be completed in a fraction of the time it would take to actually read every word. Still, even if the listener hears 40 pages a day, it will be more than five weeks before War and Peace is completed.

The problem with the recorded spoken word, when recorded in a format like cassette tapes or compact discs, is that the playback rate is the same as the generation rate. In the case of a novel, the listener hears the spoken words at the same rate that the reader produced them. People are generally capable, however, of comprehending the meaning of spoken words at a rate which is significantly higher than the rate at which it is produced. Testing has shown that comprehension at a playback speed that is 1.5 to 2 times; the original recording speed is often practical.

The problem with simply increasing the speed of a tape or similar recording format is that the intelligibility of the content can be compromised. A typical effect is that the pitch of the speaker's voice gets higher. While David Saville made a career using this technique to create his "Alvin and the Chipmunks", people often prefer to hear a speaker's voice with its normal pitch and tambre.

There is thus a need for an improved method and system for increasing the playback speed of a recording without reducing the intelligibility of the recorded content.

BRIEF DESCRIPTION OF THE DRAWINGS

FIG. 4 illustrates an alternate method for increasing the playback speed of recorded content in accordance with the invention.

Figure 1:
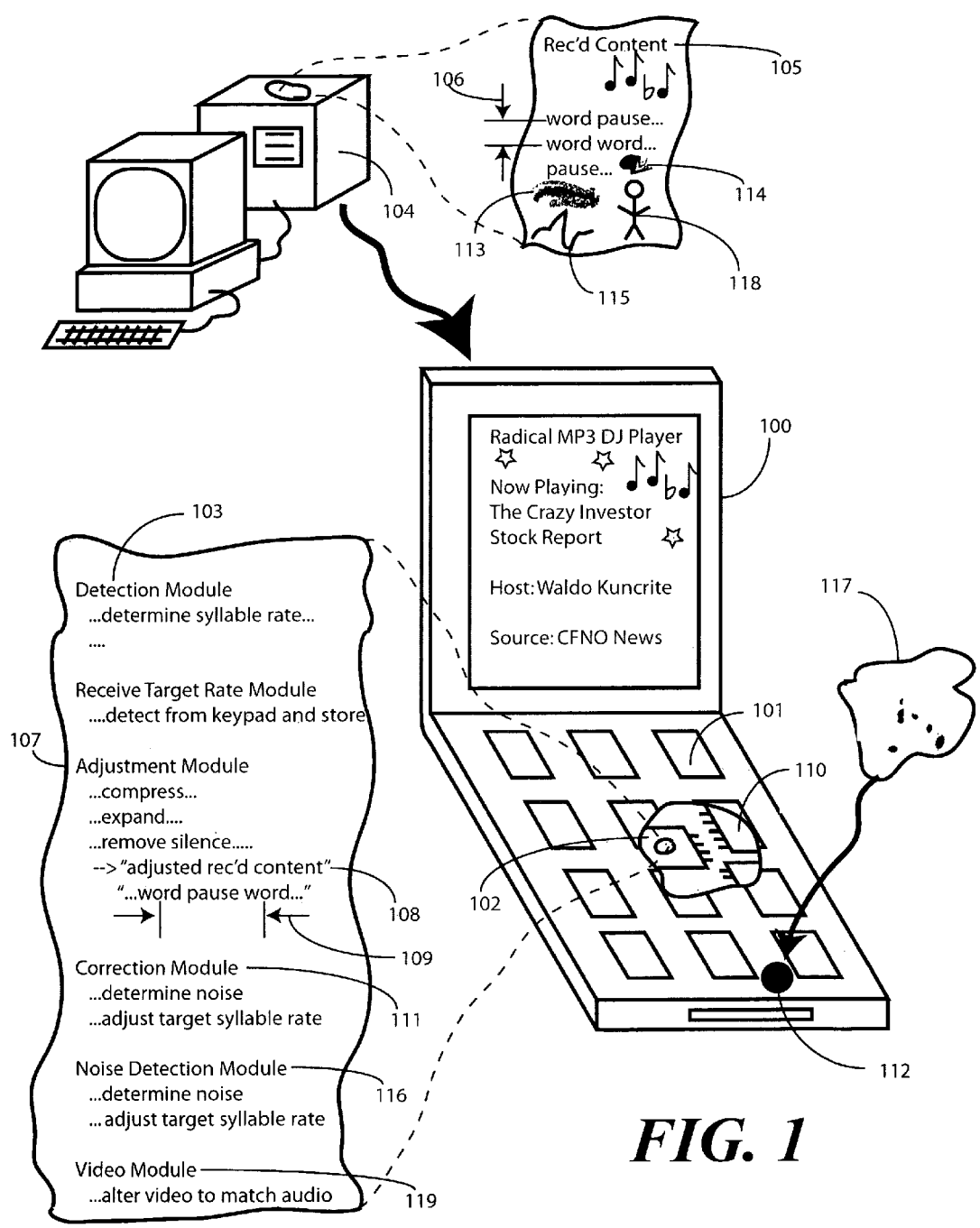
FIG. 1 illustrates one embodiment of a system for increasing the playback speed of recorded content in accordance with the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in combinations of method steps and apparatus components related to increasing the playback speed of recorded content. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors and unique stored program instructions that control the one or more processors to implement, in conjunction with certain non-processor circuits, some, most, or all of the functions of increasing the playback speed of recorded content as described herein. As such, these functions may be interpreted as steps of a method. Alternatively, some or all functions could be implemented by a state machine that has no stored program instructions, or in one or more application specific integrated circuits, in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and circuits with minimal experimentation.

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Reference designators in parentheses indicate elements in figures not presently under discussion. For example, a recital of element A (111) while discussing FIG. 2 indicates that element A appears in a figure other than FIG. 2.

New technologies, like "podcasting", haven enabled recorded content, like audio and video files, to be distributed over the Internet. Listeners can easily download this digital content and listen to the recorded content at the time and place of their choosing. A podcast is just one example of many forms of digital content, wherein information is stored in quantized bytes of data rather than as continuous analog signals. By storing the content digitally, the content may be played back via computers or other devices, like MP3 (MPEG-1 Audio Layer-3) players. Further, recorded content stored as digital data is well suited to the present invention as the playback speed of digital content may be digitally altered in accordance with the invention without reducing the overall intelligibility of the information.

In accordance with the present invention, the playback speed of recorded content may be altered so as to match a target syllable rate. The target syllable rate may be obtained in a variety of ways. In one embodiment, a user enters the target syllable rate by way of a user interface. For example, where the user desires to hear content at a rate of 300 syllables per minute, the user may enter such a rate as the target syllable rate. In another embodiment, a predetermined target syllable rate is associated with a source of origin for the recorded content. For example, if a person listens to the George P. Burdell Stock Report every day via podcast, and prefers to listen to Mr. Burdell at 292 syllables per minute, the system may check to determine the source of recorded content material when it is received. If the source is associated with Mr. Burdell for example, the system may automatically set the target syllable rate to 292 syllables per minute to accommodate the user's preference.

A system in accordance with the invention then measures an actual syllable rate associated with the recorded content. The actual syllable rate, in one embodiment, may be estimated or measured in a variety of ways. For instance, in one embodiment, detection of the actual syllable rate may be done by way of a Gaussian mixture model as is known in the art. In another embodiment, zero crossings in a sampled signal may be used to estimate the actual syllable rate. Other methods are identified below.

An adjustment module then increases or decreases the playback speed of the recorded content such that the target syllable rate and playback syllable rate substantially match. In one embodiment, time domain harmonic scaling is used to compress the digitally recorded speech, such that the playback speed, and thus the playback syllable rate, is different from the original playback speed and syllable rate. Additionally, pauses between sounds, words, or phrases may be compressed. For instance, a pause between speakers, where multiple speakers are presenting lectures, may be reduced. Further, filler passages may be compressed. By way of example, many news programs include musical interludes between pieces. Such superfluous interludes may be compressed or eliminated.

Turning now to FIG. 1, illustrated therein is a system for altering the playback speed of recorded content in accordance with the invention. An electronic device 100 capable of receiving and playing recorded content includes a display and a user interface 101. The device could be any of a variety of devices, including mobile telephones, two way radios, personal computers, personal digital assistants, MP3 players, DVD (Digital Video Disc) players, gaming devices, and the like. For illustration purposes, the device 100 shown in FIG. 1 is a mobile telephone that includes software capable of storing and replaying recorded content files. Examples of such a device are the ROKR™ and SLVR™ phones, manufactured by Motorola, Inc., which include software capable of playing MP3 and other digital audio files. It will be clear to those of ordinary skill in the art having the benefit of this disclosure that the device 100 may play recorded video content in addition to audio. One example of such a device 100 is the Motorola RAZR™ V3c equipped with video capabilities.

The device 100 includes a user interface unit 101. In the exemplary embodiment of FIG. 1, the user interface 101 is a keypad. Other user interface units, included touch-sensitive displays, multifunction buttons, and voice recognition systems may also be used. In one embodiment of the invention, a user is able to enter a target syllable rate for use with the invention. In other words, the user interface 101 is configured to receive and store a target playback syllable rate. In another embodiment, which is discussed in more detail below, the target playback syllable rate is determined by identifying the source of the recorded content 105.

A processing unit 102 is coupled to the user interface 101. The processing unit 102 may include a microprocessor and associated memory capable of executing embedded software instructions so as to run the operating system and various applications present on the device 100. When the user interface 101 is actuated, the processing unit 102 detects the actuation and receives the target playback syllable rate, among other information, for usage with the various applications of the device 100.

The processing unit 102 is also capable of receiving and storing recorded content 105. Recorded content 105 may be delivered from a computer 104, server, or other device to the electronic device 100 for storage in memory and subsequent playback. The recorded content 105 may include audio content, video content or a combination thereof. For instance, the recorded content 105 may be a podcast that is delivered from a computer 104 to the device 100 by way of a wired or wireless link. The recorded content 105, where the device 100 includes a wireless transceiver, may also be delivered from a server through either a local or wide area network. Once received, the recorded content 105 may be played to a listener by way of a loudspeaker coupled to the device 100, by a wired connection to an external pair of loudspeakers, by way of a wireless connection to external loudspeakers, or by other suitable means.

The processing unit 102 includes a detection module 103 that is capable of detecting a syllable rate 106 associated with the recorded content 105. As noted above, the detection module 103—which may comprise a group of embedded software commands in memory—is capable of either measuring or estimating the syllable rate 106 in any of a number of ways. Methods for determining a speaking rate are known in the art. For example, one such method is set forth by T. Pfau and G. Ruske, both of the Technical University of Munich, in an article entitled "Estimating the Speaking Rate by Vowel Detection", which was published by the IEEE in 1998, publication number 0-7803-4428-619. Another method is set forth by January 1. Verhusselt and Jean-Pierre Martens, both of the University of Ghent, Belgium, in an article entitled "A Fast and Reliable Rate of Speech Detector". Yet another method is set forth by Nelson Morgan and Eric Folser-Luisser of the University of California at Berkeley in IEEE publication No. 0-7803-4428-6/98, entitled "Combining Multiple Estimators of Speaking Rate".

Once the syllable rate 106 is known, an adjustment module 107 is configured to alter the playback speed of the recorded content 105 such that the adjusted recorded content 108 has an adjusted playback syllable rate 109 associated therewith. The adjusted playback syllable rate 109 will often be greater than the original syllable rate 106, as a listener is generally able to comprehend speech much more rapidly than it is produced. There will be occasion, however, when a speaker speaks faster than a listener prefers. In such a scenario, the adjusted playback syllable rate 109 will be less than the original syllable rate 106.

In one embodiment, the adjustment module 107 alters the recorded content 105 by way of time domain harmonic scaling. Time domain harmonic scaling is well suited for the present invention in that it allows speech and other forms of recorded content to be compressed in time (or lengthened) to make the overall syllable rate greater (or less) than the original without changing fundamental characteristics like pitch. Time domain harmonic scaling, which is known in the art, works by attempting to find the period or fundamental frequency of a given section of a signal using a peak detection algorithm. Examples of pitch detection algorithms include detecting the peak of a signal's autocorrelation and cepstral processing. The signal is then compressed while maintaining this fundamental frequency.

A buffer 110, which may be either volatile or non-volatile memory, is coupled to the processing unit 101. The buffer 110 is capable of storing part or all of the recorded content 105 for playback at the user's convenience. For example, when the device 100 receives the recorded content 105, it may be stored in the buffer 110. As the adjustment module 107 alters the playback speed of the recorded content 105, portions or predetermined amounts of the recorded content 105 are read from the buffer 110, processed to alter the effective syllable rate, and are rewritten to the buffer 110 as adjusted recorded content 108. The adjusted recorded content 108 can then be played to the user at the adjusted playback syllable rate 109.

In one embodiment, when the adjustment module 107 alters the playback speed of the recorded content 105, it does so such that the adjusted playback syllable rate 109 and the target playback syllable rate are substantially the same. As such, a user may enter a target playback syllable rate by way of the user interface 101, and the adjustment module 107 then converts the recorded content 105 such that the adjusted playback syllable rate 109 substantially matches the target playback syllable rate.

Some forms of recorded content 105, including live performances and performances recorded with inferior equipment, will include various forms of corruption. This corruption may include background noise 113 present at the time of the performance and was captured by the recording equipment. Another form of corruption is distortion 114 caused by various recording and signal processing systems. Additionally, a speaker or performer may have a particular audible intonation characteristic 115, for example a strong regional or national accent, which reduces the overall intelligibility of the content. The present invention includes optional modules capable of adjusting or otherwise correcting for these various forms of noise.

Specifically, a correction module 111 is configured to determine an amount of noise associated with recorded content 105. For example, where the noise is background noise 113, the correction module 111 may determine the amount of noise by performing, for example, a Fourier analysis and then measuring a signal to noise ratio. Other suitable methods for detecting amounts of noise are known in the art. For example, one such system is taught by the Telecommunication Standardization Sector of the International Telecommunication Union in ITU-T Recommendation P.563 entitled "Single-ended Method for Objective Speech Quality Assessment in Narrow Band Telephony Applications". Where the noise is distortion, the correction module 111 may detect the level of distortion in a manner set forth in ITU-T Recommendation P.563.

Where the noise is a particular speech intonation characteristic 115, a correction rate may be entered by the user by way of the user interface 101. Alternatively, the correction rate may be determined by identifying the source of the recorded content 105.

When any form of noise—distortion 114, background noise 113, or audible intonation characteristic 115—is detected, the correction module 111 may compensate by adjusting the target syllable rate. For example, where a user enters a target syllable rate of 290 syllables per minute, and the correction module 111 determines that a large amount of distortion 114 is present in the recorded content 105, the correction module 111 may reduce the target syllable rate by a particular factor, for instance 10%, to keep the adjusted recorded content 108 substantially intelligible to the listener. The correction may be applied by scaling, subtracting, or otherwise reducing the target syllable rate.

In addition to noise present in the recorded content 105, there may additionally be ambient noise 117 present about the listener. One optional feature of the present invention is a noise detection module 116 that is configured to adjust the target syllable rate based upon ambient noise 117 present at the listener's location. A microphone 112 is coupled to the device 100 and is capable of sensing ambient noise 117. Through the microphone 112, the noise detection module 116 determines the amount of ambient noise 117. Upon the noise detection module 116 determining the amount of ambient noise 117, the correction module 111 may alter the target syllable rate.

Note that for any particular recorded content 105, the syllable rate during a first portion may be different from that during a second portion. For example, where the recorded content 105 is a newscast, the anchor may speak with a syllable rate that is different from that of the meteorologist. To cope with such scenarios, in one embodiment of the invention, the detection module 103 is capable of iteratively determining the syllable rate. Said differently, the detection module 103 may determine a first syllable rate for a first subset of the recorded content 105, a second syllable rate for a second subset of the content, and so forth. Using the newscast example from above, a first syllable rate may be computed for the anchor's segment, a second for the meteorologist's segment, and so forth. As the detection module 103 may not be able to detect a change in speakers, it may calculate the syllable rate 106 continuously. For instance, every so often it may recalculate the syllable rate 106 on an iterative basis.

When the detection module 103 calculates different syllable rates for different subsets of the recorded content 105, the adjustment module 107 may alter the recorded content 105 such that a playback speed of the adjusted recorded content 108 during a first subset is different from the playback speed of the adjusted recorded content 108 during a second subset.

As the recorded content 105 may include not only audio content but video content 118 as well, in one embodiment the video module 119 is configured to adjust the playback speed of the video content 118. Were the video content 118 not adjusted, the video playback would lag the adjusted audio. To prevent this problem, the video module 119 is configured to alter the playback speed of the video content 118 proportionally with a change between the actual syllable rate 106 and the altered playback syllable rate 109.

Figure 2:
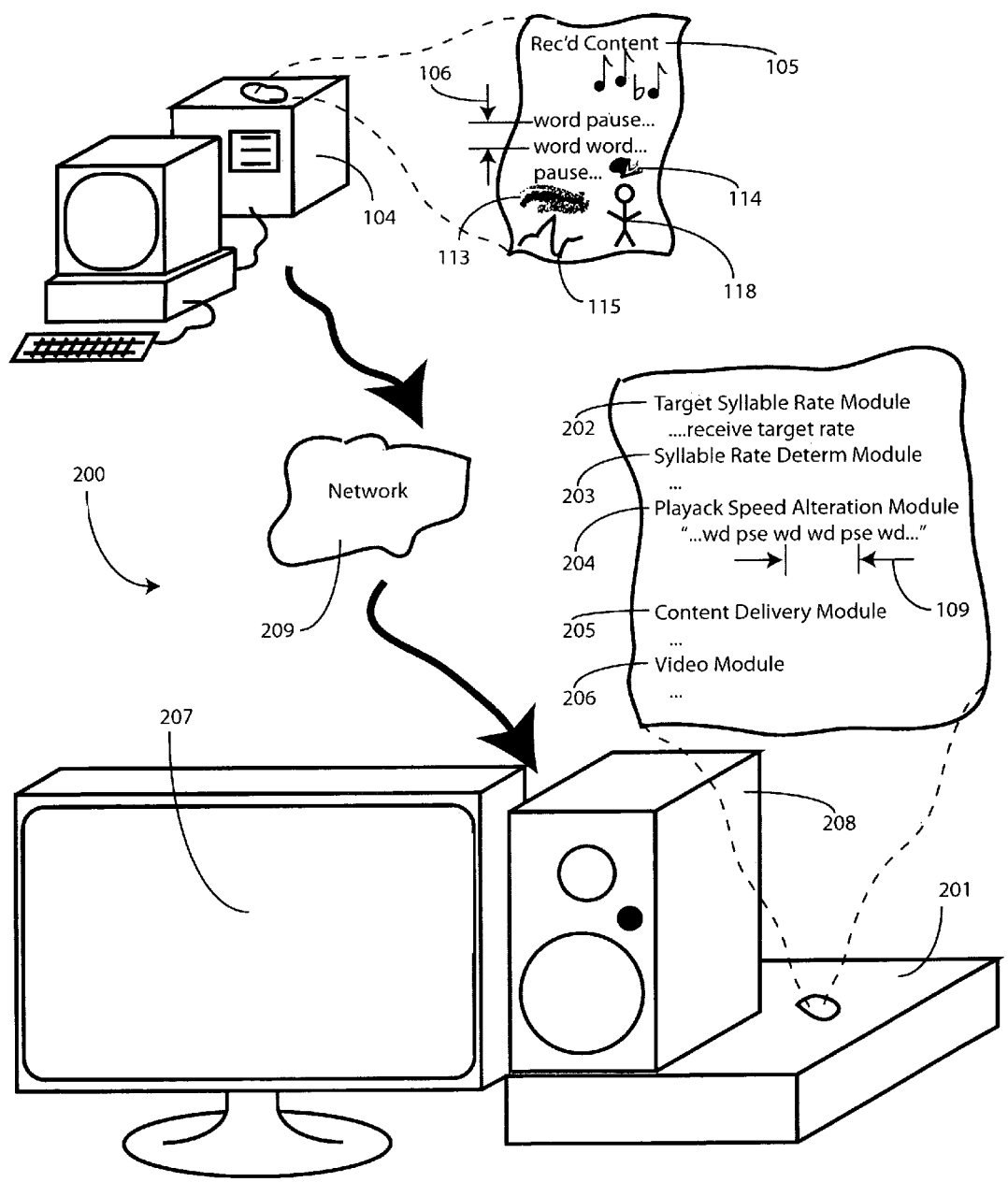
FIG. 2 illustrates an alternate embodiment of a system for increasing the playback speed of recorded content in accordance with the invention.

Turning now to FIG. 2, illustrated therein is a system 200 for providing recorded content 105 to a remote player 201 in accordance with the invention. While the electronic device (100) of FIG. 1 was essentially a self contained unit, with storage of the recorded content (105) and playback in the same unit, the system 200 of FIG. 2 includes a remote player 201 that receives, stores, and processes the recorded content 105, while another monitor, e.g. 207,208, plays the adjusted recorded content back to a user. One example of such a system is a television receiver box, which serves as the remote player 201, while a video monitor 207 and audio monitor 208 provide playback capabilities.

As with FIG. 1, the original recorded content 105 may be transmitted from a remote location, such as a server 104 or other distribution system, through a network 209 to the remote player 201. For instance, a television server may be server 104, and may transmit through either a wired cable network or through a satellite distribution network to the remote player. Either the wired cable network or the satellite distribution network serves as the network 209 in FIG. 2. It will be clear to those of ordinary skill in the art having the benefit of this disclosure that the invention is not so limited, however. Original recorded content 105 may be provided to the remote player 201 by a user directly. For example, a user may provide recorded content 105 by way of a compact disc or digital video disc.

Within the remote player 201 is electrical circuitry, including processing circuitry and memory circuitry (not shown). This electrical circuitry, in one embodiment, is capable of executing software instructions stored locally in memory. In the alternative, state machines and application specific integrated circuits may be configured to perform the operations associated with the modules that are discussed below.

In one embodiment, the remote player 201 includes a target syllable rate module 202 that is configured to receive a target playback syllable rate. This target playback syllable rate may be received, as noted above, from a user interface device. Alternatively, the remote player 201 may automatically select a target syllable rate based upon the source or content of the recorded content 105. Another option is for the server 104 to embed a suggested target syllable rate within the recorded content 105 that is transmitted through the network 209.

As with the device (100) of FIG. 1, the remote player also includes a module 203 configured to determine an actual syllable rate 106 associated with the recorded content 105. Once the actual syllable rate 106 and target syllable rate are known, an alteration module 104 is configured to alter the playback speed of the recorded content 105 such that the target syllable rate substantially matches playback syllable rate 109. As with the embodiment of FIG. 1, in one embodiment, this alteration may be completed by way of time domain harmonic scaling. Since in the system of FIG. 2 an external monitor 207,208 is responsible for playback, the remote player includes a content delivery module 205 configured to deliver the recorded content having the altered playback syllable rate associated therewith to a content player, such as the video monitor 207, audio monitor 208, or similar device.

Where the recorded content 105 includes a video component 118, the system further includes a video module 206 configured to alter the video component 118—i.e. the recorded video content. The alteration in playback speed of the video component 118 is proportional to the change between the actual syllable rate 106 and the target syllable rate. As with FIG. 1, where the recorded content 105 includes noise, such as distortion 114, background noise 113, or audible intonation characteristics 115, the alteration module may adjust the target syllable rate prior to altering the playback speed of the recorded content 105.

Figure 3:
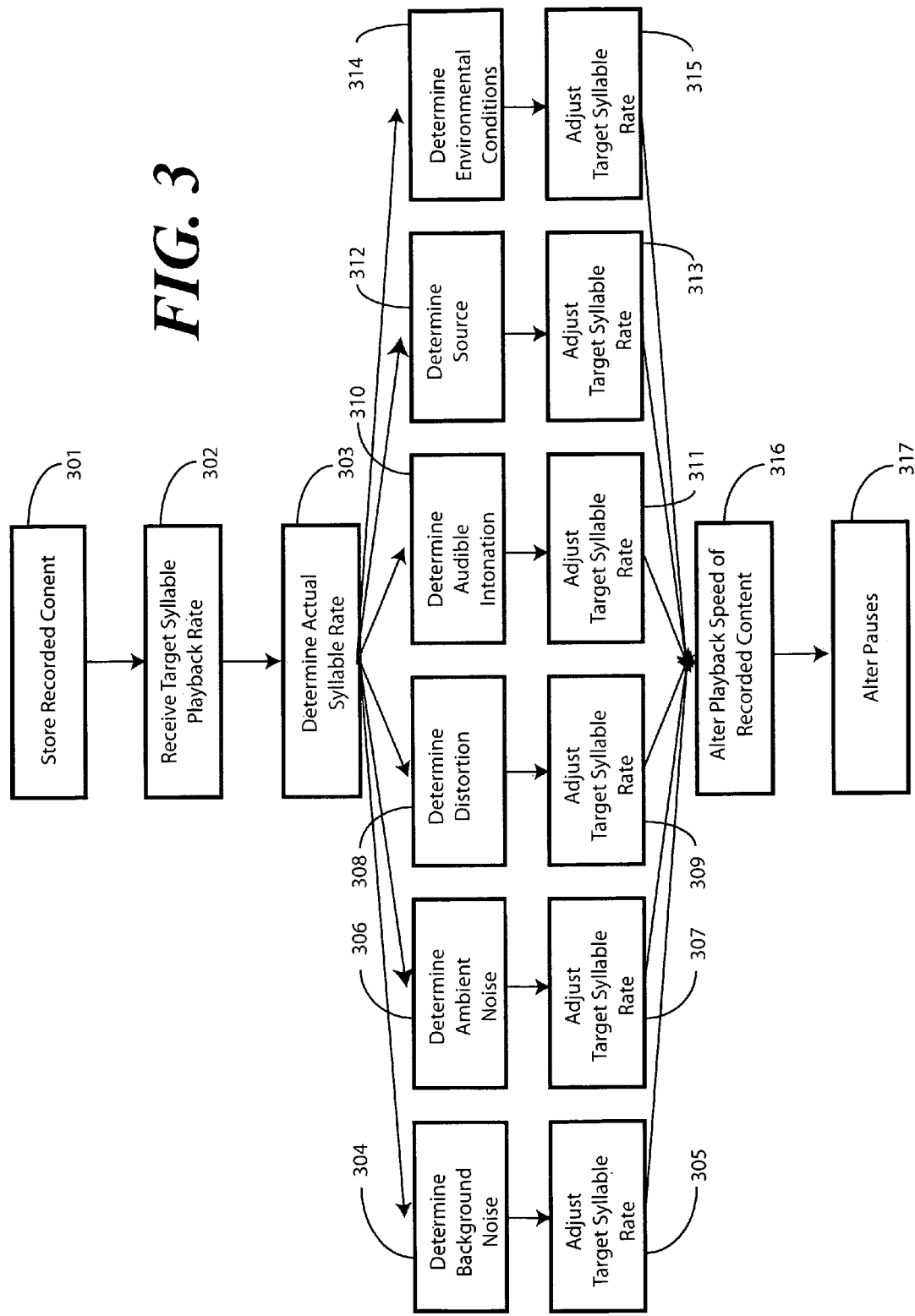
FIG. 3 illustrates one method for increasing the playback speed of recorded content in accordance with the invention.

Turning now to FIG. 3, illustrated therein is one method of altering a playback speed of recorded content in accordance with the invention. At step 301, recorded content is stored. At step 302, a system or electronic device in accordance with the invention receives a target playback syllable rate. At step 303, an actual syllable rate of a selected sample of recorded content is determined. Once the target playback syllable rate is known, at step 316, the playback speed of the recorded content is altered such that the recorded content has an altered playback syllable rate associated therewith. In one embodiment, the target playback syllable rate and the altered playback syllable rate substantially match. One suitable method for altering the playback speed is by performing a time domain harmonic scaling upon the recorded content. Where the recorded content includes informational pause portions, for example where no audible content is present, these pauses may be altered at step 317.

As noted above, recorded content may contain many forms of noise. As such, any of the noise adjustment steps, i.e. steps 304,305, steps 306,307, steps 308,309, steps 310,311, steps 312,313, or steps 314,315 may be employed. Combinations may also be used. Further, it will be obvious to those of ordinary skill in the art having the benefit of this disclosure that other forms recording impurities may be present and may be corrected in a similar fashion.

Where the recorded content includes significant background noise, at step 304 the amount of background noise present in the recorded content is determined. At step 305, the target playback syllable rate is adjusted based upon the amount of background noise present in the recorded content.

Where ambient noise is present about the listener, in one embodiment as illustrated as step 306, the amount of ambient noise occurring during playback is determined. At step 307, the target playback syllable rate is adjusted based upon the amount of ambient noise occurring during playback.

Where the recorded content includes distortion, the amount of distortion present is measured and determined at step 308. At step 309, the target playback syllable rate is adjusted based upon the distortion present in the recorded content.

Where a speaker, presenter, or component of the recorded content has a particular audible intonation characteristic, this is detected at step 310. As noted above, such a characteristic may be determined from either a listing of the content or a source of the recorded content. Where such an intonation characteristic is present, at step 311 the target playback syllable rate is adjusted based upon the audible intonation characteristic associated with the recorded content.

Where a source of content is known for distributing content having characteristics affecting intelligibility, the knowledge of the source may be used to adjust the playback speed. For example, where recorded content is created with older or inferior recording equipment, it may not be suitable for playback at the target syllable rate. As such, a user may prescribe a certain adjustment value for any recorded content coming from such a source. Where this is the case, at step 312, the source of recorded content may be determined. At step 313, the target syllable rate of the recorded content may be altered by a predetermined playback adjustment rate that corresponds to the source of the recorded content.

In certain situations, environmental conditions may affect the playback. For example, where a listener is listening in an automobile, and it begins to rain heavily, the added attention needed to focus upon a rain soaked road may affect the rate at which he can intelligibly understand the content. As such, the system may detect the actuation of the windshield wipers for instance, and adjust the target rate accordingly. In another example, where the user is exercising at an elevated level, perhaps on a treadmill or stationary bicycle, they may not be able to concentrate with their normal level of focus. In those situations, they may prefer that the playback speed be reduced.

To accommodate such situations, at step 314 the environmental conditions of the user are determined. These conditions may be biometric, or may be supplied by an external system or device, like an automobile. At step 315, the target playback syllable rate is adjusted based upon environmental condition of the user.

Turning now to FIG. 4, illustrated therein is another method of altering a playback speed of recorded content in accordance with the invention. While the method of FIG. 3 relied upon the receipt of a target syllable rate, the method of FIG. 4 uses a source of content to provide a desired playback syllable rate to a user.

At step 401, the recorded content is received. At step 402, the source of the recorded content is determined. Once the source is determined, the playback syllable rate may be set in one of a variety of ways. In one embodiment, a predetermined playback adjustment rate may be used to alter the playback speed of the content by a fixed adjustment rate. By way of example, where the recorded content is received from source A, a predetermined playback adjustment rate corresponding to the source may be stored in a look-up table. Where a user desires content from source A to be played 25% faster, the predetermined playback adjustment rate may be a fixed adjustment rate of 1.25. Similarly, when content is received from source B, and a user desires such content to be slowed by 5%, the predetermined playback adjustment rate corresponding to source B may be a fixed adjustment rate of 0.95.

In another embodiment, rather than altering the content by a fixed adjustment rate, the predetermined playback adjustment rate may be determined from a target playback syllable rate and an assumed content syllable rate. By way of example, when content is received from source A, the system may determine from a look-up table that the actual syllable rate for content coming from source A is estimated or presupposed to be 175 syllables per minute. Where the target playback syllable rate is 225 syllables per minute, the content would be altered so as to be played back accordingly. Such an embodiment eliminates the need for a measurement of an actual syllable rate, as an estimated or presupposed syllable rate associated with the source may be read from memory.

In another embodiment, where a target playback syllable rate is known, the system may simply alter the playback speed, measuring the playback speed in real time, until the playback speed substantially matches the target syllable rate. Such a feedback method is similar to that described in conjunction with FIG. 3.

Returning to FIG. 4, from the source information, a system in accordance with the invention may alter the recorded content to achieve the desired playback syllable rate by one of the methods listed above. Further it will be clear to those of ordinary skill in the art having the benefit of this disclosure that other methods may be used. In any case, at step 416, the playback speed of the recorded content is altered by a predetermined playback adjustment rate corresponding to the source of the recorded content. Where the content includes informational pause portions, these may be compressed at step 417.

As with the discussion of the method of FIG. 3, recorded content may contain many forms of noise. As such, any of the noise adjustment steps, i.e. steps 404,405, steps 406,407, steps 408,409, steps 410,411, steps 412,413, or steps 414,415 may be employed. Combinations may also be used. Further, it will be obvious to those of ordinary skill in the art having the benefit of this disclosure that other forms recording impurities may be present and may be corrected in a similar fashion.

Where the recorded content includes significant background noise, at step 404 the amount of background noise present in the recorded content is determined. Where a target syllable rate is known, at step 405 the target playback syllable rate is adjusted based upon the amount of background noise present in the recorded content. Where another predetermined playback adjustment rate is used, for example a fixed adjustment rate, at step 405 this adjustment rate may be altered based upon the amount of background noise present in the recorded content.

Where ambient noise is present about the listener, at step 406 the amount of ambient noise occurring during playback is determined. At step 407, where the target syllable rate is known, the target playback syllable rate is adjusted based upon the amount of ambient noise occurring during playback. Where another predetermined playback adjustment rate is used, for example a fixed adjustment rate, at step 407 this adjustment rate may be altered based upon the amount of ambient noise.

Where the recorded content includes distortion, the amount of distortion present is measured and determined at step 408. At step 409, where a target playback syllable rate is known, the target playback syllable rate is adjusted based upon the distortion present in the recorded content. Where another predetermined playback adjustment rate is used, for example a fixed adjustment rate, at step 409 this adjustment rate may be altered based upon the distortion present in the recorded content.

Where a speaker, presenter, or component of the recorded content has a particular audible intonation characteristic, this is detected at step 410. Where such an intonation characteristic is present, and where a target playback syllable rate is known, at step 411 the target playback syllable rate is adjusted based upon the audible intonation characteristic associated with the recorded content. Where another predetermined playback adjustment rate is used, for example a fixed adjustment rate, at step 411 this adjustment rate may be altered based upon the audible intonation characteristic.

At step 412, the source of recorded content may be determined. At step 413, where the target playback syllable rate is known, the target playback syllable rate of the recorded content may be altered by a predetermined playback adjustment rate that corresponds to the source of the recorded content. Where another predetermined playback adjustment rate is used, for example a fixed adjustment rate, at step 413 this adjustment rate may be altered based upon the noise characteristics associated with that particular source. For instance, where the source and channel are known, the fixed adjustment rate may be adjusted by an amount corresponding to the channel. Where content from source A is received digitally, for example, the fixed adjustment rate may not be altered, while content from source A received through an analog channel may cause the fixed adjustment rate to be altered.

At step 414 the environmental conditions of the user are determined. These conditions may be biometric, or may be supplied by an external system or device, like an automobile. At step 415, where the target playback syllable rate is known, the target playback syllable rate is adjusted based upon environmental condition of the user. Where another predetermined playback adjustment rate is used, for example a fixed adjustment rate, at step 415 this adjustment rate may be altered based upon the environmental conditions.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention.

What is claimed is:

1. A method of altering a playback speed of recorded content, the method comprising:
   receiving a target playback syllable rate;
   determining an actual syllable rate associated with the recorded content;
   determining one or more of an amount of noise present in the recorded content or an amount of noise occurring during playback;
   adjusting the target playback syllable rate based upon the one or more of the amount of noise present in the recorded content or the amount of noise occurring during playback; and
   altering the playback speed of the recorded content such that the recorded content has an altered playback syllable rate associated therewith, wherein the target playback syllable rate and the altered playback syllable rate substantially match.

2. The method of claim 1, wherein the step of altering the playback speed of the recorded content comprises performing a time domain harmonic scaling upon the recorded content.

3. The method of claim 2, wherein the recorded content comprises a plurality of informational pause portions, wherein the method further comprises the step of altering a duration of at least one of the plurality of informational pause portions.

4. The method of claim 1, wherein the amount of noise occurring present in the recorded content comprises background noise present in the recorded content, further comprising adjusting the target playback syllable rate based upon the amount of background noise present in the recorded content.

5. The method of claim 1, wherein the amount of noise occurring during playback comprises ambient noise occurring during playback, further comprising adjusting the target playback syllable rate based upon the amount of ambient noise occurring during playback.

6. The method of claim 1, further comprising the steps of:
   a. determining an amount of distortion present in the recorded content; and
   b. adjusting the target playback syllable rate based upon the distortion present in the recorded content.

7. The method of claim 1, further comprising the steps of:
   a. determining an audible intonation characteristic associated with the recorded content; and
   b. adjusting the target playback syllable rate based upon the audible intonation characteristic associated with the recorded content.

8. The method of claim 1, further comprising the step of:
   a. determining a source of the recorded content; and
   b. altering the playback speed of the recorded content by a predetermined playback adjustment rate corresponding to the source of the recorded content.

9. The method of claim 1, further comprising the step of:
   a. determining an environmental condition of a user; and
   b. adjusting the target playback syllable rate based upon environmental condition of the user;
   wherein the environmental condition is determined by receiving one of data from a vehicle and biometric feedback.

10. A electronic device, comprising:
   a. an interface unit configured to receive and store a target playback syllable rate;
   b. a processing unit coupled to the interface unit, the processing unit comprising:
      i. a detection module configured to determine a syllable rate associated with recorded content; and
      ii. an adjustment module configured to alter the target playback syllable rate based upon one or more of an amount of noise occurring in the recorded content or an amount of noise occurring during playback and alter a playback speed of recorded content such that adjusted recorded content has an adjusted playback syllable rate associated therewith;
   c. a buffer coupled to the processing unit, the buffer being capable of storing at least a predetermined amount of recorded content;
   wherein the adjustment module alters the playback speed of the recorded content such that the adjusted playback syllable rate and the target playback syllable rate are substantially the same.

11. The electronic device of claim 10, further comprising a correction module configured to determine one of an amount of background noise associated with the recorded content, an amount of distortion associated with the recorded content, and an audible intonation characteristic associated with the recorded content, wherein upon determining the one of the amount of background noise associated with the recorded content, the amount of distortion associated with the recorded content, and the audible intonation characteristic associated with the recorded content, the correction module adjusts the target playback syllable rate.

12. The electronic device of claim 10, further comprising a microphone and a noise detection module configured to determine an amount of ambient noise present during playback, wherein upon determining the amount of ambient noise, the correction module alters the target playback syllable rate.

13. The electronic device of claim 10, wherein the detection module is configured to determine a syllable rate associated with at least a first subset of the recorded content and a second subset of the recorded content, such that the playback speed of the recorded content during the first subset of recorded content is different from the playback speed of the recorded content during the second subset of recorded content.

14. The electronic device of claim 10, wherein the recorded content comprises video content and audio content, a video module configured to alter the playback speed of the video content proportionally with a change between the actual syllable rate and the altered playback syllable rate.

15. A system for providing recorded content to a remote player, the system comprising:
   a module configured to receive a target playback syllable rate;
   a module configured to determine an actual syllable rate associated with recorded content;
   a module configured to determine an amount of background noise occurring in the recorded content;

a module configured to determine an amount of ambient noise occurring during playback;

a module configured to alter the target playback syllable rate based upon at least the amount of background noise occurring in the recorded content and the amount of noise occurring during playback;

a module configured to alter a playback speed of the recorded content such that the recorded content has an altered playback syllable rate associated therewith, wherein the target playback syllable rate and the altered playback syllable rate substantially match; and a module configured to deliver the recorded content having the altered playback syllable rate associated therewith to a content player.

16. The system of claim 15, further comprising a video module configured to alter recorded video content proportionally with a change between the actual syllable rate and the altered playback syllable rate.

17. The system of claim 15, wherein the module configured to alter a playback speed of the recorded content alters the playback speed of the recorded content by one of time domain harmonic scaling and altering a duration of at least one informational pause found within the recorded content.

18. A method of altering a playback speed of recorded content, the method comprising:

determining a source of the recorded content and an actual syllable rate associated with the recorded content;

determining a target playback syllable rate;

determining at least one of an amount of noise present in the recorded content or an amount of noise during playback;

adjusting the target playback syllable rate based upon the at least one of the amount of noise present in the recorded content or the amount of noise during playback; and altering the playback speed of the recorded content by a playback adjustment rate such that the recorded content has an altered playback syllable rate associated therewith, wherein the target playback syllable rate and the altered playback syllable rate substantially match.

19. The method of claim 18, further comprising:

determining an amount of distortion present in the recorded content; and altering the predetermined playback adjustment rate based upon the distortion present in the recorded content.

* * * * *